No. 625,715. Patented May 23, 1899.
W. E. WHITTINGTON.
COMPUTING YARD MEASURE.
(Application filed Feb. 24, 1899.)
(No Model.)
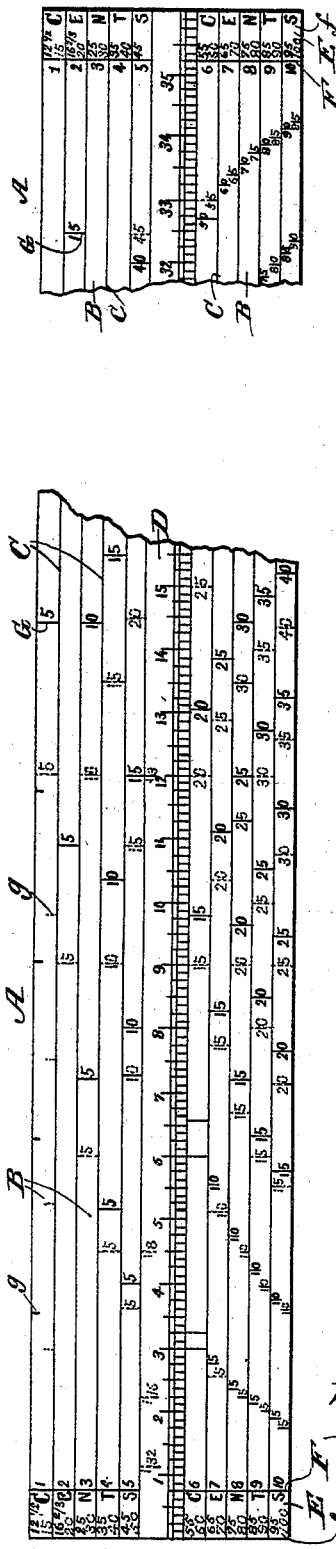
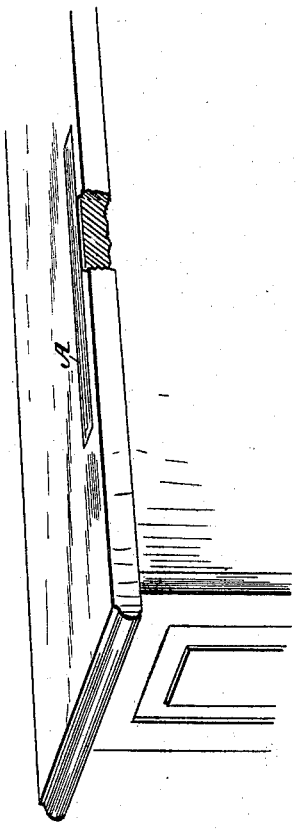
Witnesses.
Inventor:
William E. Whittington,
By
James L. Norris,
Atty.
THE NORRIS PETERS CO., PHOTO-LITHO., WASHINGTON, D. C.

UNITED STATES PATENT OFFICE.

WILLIAM E. WHITTINGTON, OF KUTTAWA, KENTUCKY, ASSIGNOR OF ONE-HALF TO W. COLE WAGGENER, OF SAME PLACE.

COMPUTING YARD-MEASURE.

SPECIFICATION forming part of Letters Patent No. 625,715, dated May 23, 1899.

Application filed February 24, 1899. Serial No. 706,731. (No model.)

*To all whom it may concern:*

Be it known that I, WILLIAM E. WHITTINGTON, a citizen of the United States, residing at Kuttawa, in the county of Lyon and State of Kentucky, have invented new and useful Improvements in Computing Yard-Measures, of which the following is a specification.

This invention relates to a computing yard-measure, and has for its object to provide a device for measuring dry goods and the like by means of which, the selling price per yard of the goods being given, the proper quantity of goods to be sold for any definite sum of money may be instantly measured off without necessitating any calculation or mental computation on the part of the salesman.

It has for its further object to provide such a measure with a linear scale whereby the length of goods measured off is indicated.

It has for another object to so form or apply the characters to the measure as to enable the latter to be made of the very smallest possible dimensions and yet permit the indicating characters to be read with despatch and certainty.

To these ends my invention consists in the features and in the arrangement hereinafter described, and particularly pointed out in the claims following the description, reference being had to the accompanying drawings, forming a part of this specification, wherein—

Figure 1 is a view of my improved device, showing it embodied in the form of a yardstick; and Fig. 2 is a perspective view, partially in section, of a shop-counter, showing my improved measure applied thereto as a fixture.

In practice the measure may either be made in the form of the ordinary hand-yardstick of any suitable or preferred material, or it may be made in the form of a strip or bar mortised or inlaid in the shop-counter. In both instances the scale is laid off in the same manner.

Referring to the drawings, the letter A indicates a measure divided into horizontal columns B by a series of parallel longitudinal lines C, ruled on its face. As shown in the present instance, there are ruled ten such lines, forming, in connection with the opposite edges of the measure, eleven horizontal columns or spaces B of equal width and a central horizontal column or space D, preferably of greater width than the columns or spaces B. Vertical columns E are formed at the opposite ends of the measure by lines F, ruled transversely thereon. In the ruled spaces *f* of the said vertical columns is marked the price per yard at which goods may be sold, the selling prices being preferably arranged progressively from the top of the column downward for the sake of ready reference. I have shown two selling prices marked in each space of the vertical columns. For example, in the top space I have marked two selling prices per yard—viz., twelve and one-half cents and fifteen cents, in the second space from the top sixteen and two-thirds cents and twenty cents, and in like manner throughout all the spaces in the vertical spaces, the object being to utilize the horizontal columns to their utmost for indicating various different selling prices, thereby enabling a large number of selling prices and measurements to be indicated on a relatively narrow measure. In order to enable the salesman to distinguish one set of selling prices and the corresponding measurements from another, I mark the selling prices alternately in contrasting colors. For example, the upper numerals in each space in the vertical columns may be marked in black, as the numbers "12½," "16¾," &c., while the lowermost numbers are marked in red, (indicated by dotted lines)—as, for example, "15," "20," &c.

The horizontal columns B are marked at suitable points by transverse lines G to indicate the length of goods to be measured off for given sums of money, the respective sums of money being marked on the face of the measure adjacent to the proper lines G. In making the measure the points at which the lines G are to be placed must of course be calculated. For example, the measure shown in the drawings is one yard or thirty-six inches in length. Hence the line G, marked (in black) ".05," (indicating the sum of five cents,) must be placed at a point indicating a distance from the left end of the measure of fourteen and three-eighths and a fraction inches, such a length of goods being that which should be sold for five cents if the selling price is twelve and one-half cents per yard. The ten-cent mark would obviously be placed at a distance of twenty-eight and six-eighths inches and a fraction from the left end of the measure. In the same horizontal column vertical lines G, in red, are marked at the proper points to indicate the length of goods to be sold for fractions of a dollar. For example, the five-cent mark will be indicated by a red line at twelve inches from the left end of the measure, that length of goods being the proper amount to be sold for five cents if the selling price is fifteen cents per yard. This arrangement is continued throughout all the horizontal columns B.

The manner of using the measure will be obvious. For example, if twenty cents' worth of goods the selling price of which is fifty-five cents a yard is desired by a purchaser, the salesman has only to refer to the number "55" in the vertical column E and then follow the corresponding horizontal column B until the line G, marked "20," is found. Then by measuring off a length of goods corresponding to the distance from the left end of the measure to the said mark "20" the proper quantity of goods to be sold for twenty cents will be given.

From the foregoing it will be seen that in order to supply a customer with goods for any given sum of money it is entirely unnecessary for the salesman to make any calculation or mental computation, thus saving time and effectually preventing any error.

The central column or space D is ruled off into inches and fractions of inches in the same manner as an ordinary yardstick, whereby the length of any piece of measured goods sold for a given price is indicated and by means of which the price of a given length of a piece of goods sold at a stated price per yard may be instantly ascertained. Taking the example above given, wherein twenty-cents' worth of goods selling at fifty-five cents a yard was measured off, the salesman by referring to the column D would immediately note that the price of goods would be thirteen and nearly one-eighth inches long, and, conversely, if the purchaser wished one-quarter of a yard of goods the selling price per yard of which is sixty cents then by referring to the space in the vertical column wherein is marked "60" and following the corresponding horizontal column until a point is reached opposite the nine-inch (or quarter of a yard) mark it will be found that the price of the goods is fifteen cents.

It will be manifest that the relative arrangement of the selling prices and their corresponding values per yard and fractions thereof may be changed to suit different circumstances and that the number of columns and spaces may also be varied; also, that a different unit of measure than inches may be adapted and the measure be made of any length desired, the principle remaining the same in all cases.

It will be noted that in the scale arranged as above described the marks G are arranged to indicate lengths corresponding to the twentieth parts of dollars—that is to say, to indicate lengths of goods to be sold for five, ten, fifteen cents, and similar fractions of a dollar. In order that smaller fractions of a dollar may also be indicated, I mark on the horizontal columns B intermediate the lines G dots $g$, there being four such dots placed equidistant apart between each two adjacent lines G. I have illustrated such an arrangement in the uppermost column B only in order to prevent confusion; but it will be understood that all the columns B will be marked off in like manner. As shown, the black dots are arranged between the black lines G, and the red dots (indicated in dotted lines) are arranged between the red lines G. Let it be assumed that but three cents' worth of goods the selling price of which is fifteen cents per yard is desired by the purchaser, then by measuring from the left end of the measure to the third red dot the desired length of goods will be indicated.

Having described my invention, what I claim is—

A computing linear measure having on one face two sets of horizontal columns bearing, respectively, at the ends characters showing the selling price per unit of measure of goods to be measured by said columns, transverse lines on all of said columns bearing characters at predetermined points which show the length of the goods to be sold for a given sum, and a column interposed between and separating the two sets of horizontal columns and graduated to a scale for showing the length of the goods sold for a given sum, substantially as described.

In testimony whereof I have hereunto set my hand in presence of two subscribing witnesses.

WILLIAM E. WHITTINGTON.

Witnesses:
H. C. COBB,
WALTER L. KROSEE.